(12) United States Patent
Kubica et al.

(10) Patent No.: US 7,090,172 B2
(45) Date of Patent: Aug. 15, 2006

(54) PROCESS FOR COUNTERING THE VIBRATIONS INDUCED IN AN AIRCRAFT BY THE WINDMILLING OF A FAN AND SYSTEM OF ELECTRIC FLIGHT CONTROLS IMPLEMENTING THIS PROCESS

(75) Inventors: François Kubica, Toulouse (FR); Dominique Briere, Ramonville Saint Agne (FR)

(73) Assignee: AIRBUS France, Toulouse (FR)

( * ) Notice: Subject to any disclaimer, the term of this patent is extended or adjusted under 35 U.S.C. 154(b) by 277 days.

(21) Appl. No.: 10/801,054

(22) Filed: Mar. 16, 2004

(65) Prior Publication Data

US 2004/0245388 A1    Dec. 9, 2004

(30) Foreign Application Priority Data

Mar. 26, 2003    (FR) .................................. 03 03697

(51) Int. Cl.
    *B04C 13/16*    (2006.01)
(52) U.S. Cl. ..................... 244/195; 244/76 C; 701/3; 701/10
(58) Field of Classification Search .............. 244/73 R, 244/76 A, 76 C, 75 A, 203, 213; 701/3, 701/10
    See application file for complete search history.

(56) References Cited

U.S. PATENT DOCUMENTS

| | | | | |
|---|---|---|---|---|
| 3,215,374 A | * | 11/1965 | Olshausen | 244/191 |
| 3,236,478 A | * | 2/1966 | Adams | 244/76 C |
| 3,240,447 A | * | 3/1966 | Olshausen | 244/177 |
| 3,279,725 A | * | 10/1966 | Andrew et al. | 244/191 |
| 3,734,432 A | * | 5/1973 | Low | 244/191 |
| 4,502,652 A | * | 3/1985 | Breitbach | 244/75 A |
| 4,591,113 A | * | 5/1986 | Mabey | 244/76 C |
| 4,615,497 A | * | 10/1986 | Seeler et al. | 244/75 A |
| 4,706,902 A | * | 11/1987 | Destuynder et al. | 244/76 C |
| 4,841,685 A | * | 6/1989 | Masri et al. | 52/1 |
| 4,865,268 A | * | 9/1989 | Tracksdorf | 244/53 B |
| 5,072,893 A | * | 12/1991 | Chakravarty et al. | 244/76 R |
| 5,135,186 A | * | 8/1992 | Ako | 244/75 A |
| 5,186,416 A | * | 2/1993 | Fabre et al. | 244/75 R |

(Continued)

FOREIGN PATENT DOCUMENTS

FR    2672028    7/1992

OTHER PUBLICATIONS

Preliminary Search Report dated Nov. 12, 2003 with English translation.

*Primary Examiner*—Michael J. Carone
*Assistant Examiner*—S. A. Holzen
(74) *Attorney, Agent, or Firm*—Stevens, Davis, Miller & Mosher, LLP

(57) ABSTRACT

A system and process for countering the vibrations induced in an aircraft by the windmilling of an engine fan may produce a first electric flight control command for a servocontrol to use in actuating a control surface of the aircraft. The servocontrol is slaved to the first electric flight control command, and the servocontrol's operation is limited to a reduced frequency band. Vibrations induced by the windmilling of the engine fan are monitored, and, when the monitored vibrations exceed a threshold, a second electric flight control command for application to the servocontrol is computed to oppose the induced vibrations. Also, the first and second electric flight control commands are summed to produce an overall control command for the control surface, and the servocontrol is temporarily slaved to the overall control command for operation in a widened frequency band.

14 Claims, 3 Drawing Sheets

U.S. PATENT DOCUMENTS

| | | | |
|---|---|---|---|
| 5,203,524 A * | 4/1993 | Laceby et al. | 244/75 A |
| 5,224,667 A * | 7/1993 | Lacabanne | 244/75 A |
| 5,375,794 A * | 12/1994 | Bleeg | 244/76 C |
| 5,667,166 A * | 9/1997 | Tran et al. | 244/76 C |
| 5,860,625 A * | 1/1999 | Tran et al. | 244/195 |
| 6,161,801 A * | 12/2000 | Kelm et al. | 244/76 C |
| 6,189,836 B1 * | 2/2001 | Gold et al. | 244/191 |
| 6,286,782 B1 * | 9/2001 | Bansemir et al. | 244/17.11 |
| 6,349,900 B1 * | 2/2002 | Uttley et al. | 244/82 |
| 6,416,017 B1 * | 7/2002 | Becker | 244/76 C |
| 6,607,161 B1 * | 8/2003 | Krysinski et al. | 244/7 A |
| 6,669,139 B1 * | 12/2003 | Kubica | 244/76 R |
| 6,772,979 B1 * | 8/2004 | Kubica et al. | 244/195 |
| 6,816,823 B1 * | 11/2004 | Becker | 703/8 |
| 2005/0116094 A1 * | 6/2005 | Pauly | 244/75 A |

* cited by examiner

PROCESS FOR COUNTERING THE VIBRATIONS INDUCED IN AN AIRCRAFT BY THE WINDMILLING OF A FAN AND SYSTEM OF ELECTRIC FLIGHT CONTROLS IMPLEMENTING THIS PROCESS

FIELD OF THE INVENTION

The present invention relates to a process making it possible to counter the vibrations induced, in an aircraft equipped with turbofans, by the windmilling of at least one of the fans of said turbofans. It also relates to a system of electric flight controls for aircraft implementing this process.

It is known that, when an aircraft turbofan is shut down in flight, for example following the rupture of one or more blades of its fan, the latter revolves in free rotation or autorotation under the effect of the airstream entering said turbofan. This phenomenon is designated in aeronautics, in a general manner, by the term "windmilling".

Such windmilling of a fan induces and propagates vibrations in the aircraft, their frequency depending on the phase of flight, but lying between 5 and 15 Hz. Such induced vibrations, on the one hand, subject the structure of the aircraft, and hence the crew and the passengers, to considerable vibratory loads and, on the other hand, may make the piloting tasks difficult, or even impossible, for the pilot who is subjected thereto.

To be able to resist these vibratory loads, the structure of the aircraft, the furnishings, the supports, the computers, the seats, etc have to be reinforced accordingly, thereby raising the total weight of the aircraft. When the aircraft is of large dimensions and is equipped with powerful engines, the reinforcements required to resist the induced vibrations give rise to an appreciable increase in weight of the aircraft, thereby impairing the latter's performance. Moreover, considerable reinforcements such as these relate only to the mechanical strength of the structure of the aircraft and do not in any way ameliorate the difficulties of piloting and the discomfort of the passengers and of the crew.

SUMMARY OF THE INVENTION

The object of the present invention is to remedy these drawbacks by avoiding an exaggerated increase in the weight of the aircraft, while allowing the pilot of the aircraft always to be able to perform the piloting tasks easily.

For this purpose, according to the invention, a process making it possible to counter the vibrations induced, in an aircraft equipped with engines of the turbofan type, by the windmilling of at least one of the fans of said engines, said aircraft comprising a system of electric flight controls which:

produces electric flight control commands intended for servocontrols able to actuate the control surfaces of said aircraft; and
slaves said servocontrols to said electric flight control commands, limiting the operation of said servocontrols in a reduced frequency band, usually of the order of from 0 to 4 Hz, is noteworthy:
in that the appearance of said induced vibrations is monitored; and
in that in case of detection of such induced vibrations:
an additional electric control command is computed, which, applied to the servocontrol of at least one control surface, allows the latter to oppose said induced vibrations;
the electric flight control command relating to said control surface and said additional electric control command are summed to obtain an overall control command for said control surface; and
said servocontrol is temporarily slaved to said overall control command, allowing the operation of said servocontrol in a widened frequency band, of the order of 0 to 15 Hz.

Thus, according to the invention, there is active intervention against the vibrations induced by the windmilling of a fan, rather than just passive intervention, as was done hitherto by reinforcing the structure of the aircraft. As a result, the structural reinforcements may be less considerable (thereby allowing significant savings of weight) and the piloting and comfort conditions are improved.

It is known that the state of the art, as regards the servocontrols used on board aircraft, consists in operating said servocontrols in a frequency passband limited above to 3 or 4 Hz, in particular out of fatigue and lifetime considerations, this passband being compatible with the frequencies controlled by the pilots or by the automatic pilot.

Now, as already mentioned above, the vibrations induced by the windmilling of at least one fan are higher and lie between 5 and 15 Hz.

It is therefore impossible for the vibratory motions produced by windmilling to be controlled by the control surfaces of the aircraft.

However, if the standard servocontrols are examined, it is noted that their actuating ram may operate at frequencies of at least 15 Hz and that the constraining of said servocontrols to a reduced frequency band is carried out in the slaving loops, which control them and which are installed in a flight control computer, by filtering of the control commands and by fixing to low values of their slaving gain.

Hence, in accordance with the present invention, when the phenomenon of windmilling is detected, the command (the additional electric control command) that must be addressed to the servocontrol of a control surface in order for the latter to counter the vibratory effects of this phenomenon is computed and said servocontrol is temporarily unconstrained so that it can operate exceptionally and temporarily at frequencies above these standard operating frequencies and thus obey said additional command.

It will be noted that, when windmilling of a fan occurs on board an aircraft, the objective of the pilot is to land as quickly as possible, so as to be able to repair or change the shut-down engine, before any resumption of flight. Thus, the aircraft, in which the windmilling will have been countered in accordance with the present invention, will only occasionally fly under widened unconstrained slaving, so that the impact on the fatigue of the servocontrols will be negligible.

It will be noted moreover that the additional electric command charged with countering said induced vibrations is not substituted for the flight control command, but is added to the latter by being juxtaposed thereto, since their frequency domains (5–15 Hz for one and 0–3 Hz for the other) are different. Thus, the piloting of the aircraft is not modified by the implementation of the process in accordance with the present invention.

Advantageously, the detection of said induced vibrations is obtained through accelerometric measurements at at least one point of the aircraft. Preferably, each of these points neighbors an engine, since it is the fan of one of them that might be the source of said vibrations. In these accelerometric measurements, those whose frequency lies between 5 Hz and 15 Hz (frequency span characteristic of windmilling) are examined and their amplitude is compared with a predetermined threshold, representative of said induced vibrations. Such a threshold is preferably determined on the basis of the modified aeroelastic model specific to said aircraft and to said engines, as is explained hereinbelow.

Moreover, to compute said additional electric control command, accelerometric measurements representative of said induced vibrations are performed at at least one location of said aircraft, and said additional electric control command is determined on the basis of preestablished relations at which, for each acceleration of said location, are able to deliver one such additional electric control command.

Advantageously, these preestablished relations also emanate from said modified aeroelastic model.

It is known that the aeroelastic model specific to an aircraft indicates, among other information, on the one hand, the amplitude, the frequency and the phase of the vibrations produced in the fuselage of the aircraft as a function of the accelerations undergone by the latter at the level of each engine and, on the other hand, the amplitude; the frequency and the phases of the vibrations produced in the fuselage of the aircraft by the toings and froings of each control surface. An aeroelastic model such as this is usually computed theoretically by the aircraft's manufacturer.

Moreover, the manufacturer of an aircraft turbofan determines, in a standard fashion, by computation, the windmilling model for the fan of said turbofan, indicating the amplitude, the frequency and the phase of the vibrations produced in the aircraft, at the location of said turbofan, by such windmilling.

Thus, by combining these two models, a modified aeroelastic model is obtained that makes it possible to establish said relations determining the order that must be addressed to a control surface so as to counter the vibrations produced at a location of the aircraft by the windmilling of an engine fan.

Of course, this modified aeroelastic model is purely theoretical and, if necessary, it is advantageous to supplement it and/or to improve it experimentally, for example through in-flight trials.

From the foregoing, it will be readily understood that said modified aeroelastic model also makes it possible to determine said amplitude threshold, serving to detect the appearance of said induced vibrations.

In one practical form of implementation of the process according to the invention, relating to an aircraft comprising at least two pairs of symmetric control surfaces (ailerons, flaps, elevators, etc), steered by a vertical flight control command and by a lateral flight control command (that is to say horizontal and orthogonal to the longitudinal axis of said aircraft):
- a first additional electric control command able to counter the vertical component of said induced vibrations at said location is computed;
- a second additional electric control command able to counter the lateral component of said induced vibrations at said location is computed;
- said electric vertical flight control command and said first additional electric control command are summed to obtain a first overall control command;
- said lateral flight control command and said second additional electric control command are summed to obtain a second overall control command;
- the servocontrols of the two symmetric control surfaces of one of said pairs are slaved to said first overall control command, in common, in such a way that these control surfaces deflect symmetrically in the same direction; and
- the servocontrols of the two symmetric control surfaces of the other of said pairs are slaved to said second overall control command, in common, in such a way that these latter control surfaces deflect antisymmetrically in opposite directions.

The present invention relates moreover to a system of electric flight controls implementing the process described hereinabove.

For this purpose, according to the invention, a system of electric flight controls for an aircraft, which is equipped with engines of the turbofan type, each comprising a fan able to windmill in case of shutdown of said engine in flight, said system producing, for the control surfaces of said aircraft, electric control commands which are addressed to respective servocontrols able to actuate said control surfaces by way of slaving means limiting the operation of said servocontrols in a reduced frequency band, usually of the order of 0 to 4 Hz, is noteworthy in that it comprises:
- means of detection of the appearance of the vibrations induced in the aircraft by the windmilling of at least one of said fans;
- means of measurement of said induced vibrations at at least one location of said aircraft;
- at least one table in which are recorded preestablished relations between the vibrations induced at said location and the order that must be addressed to at least one control surface to counter said induced vibrations;
- means of computation, connected to said means of measurement and to said table, to produce an additional electric control command which, applied to at least said control surface, is able to counter said vibrations induced at least at said location of said aircraft;
- means of summation making it possible to combine, into an overall control command for said control surface, said electric control command which relates thereto and said additional electric control command; and
- means for temporarily slaving said servocontrol to said overall command, allowing the operation of said servocontrol in a widened frequency band in the order of 0 to 15 Hz.

Said means of detection and said means of measurement comprise accelerometers. If necessary, these accelerometers could be common to both these means. However, preferably, for reasons of efficiency, each of said means comprises its own accelerometers, those of the means of detection being disposed in the neighborhood of said engines which are the source of said induced vibrations and those of the means of measurement (which determine the parameters of the action to be undertaken against said induced vibrations) being disposed rather in the fuselage and on the flight deck, precisely where the effect of said induced vibrations has to be combated most for the comfort of the passengers and the steerability of the aircraft.

The means of slaving to a reduced frequency band and the means of temporary slaving to a widened frequency band may consist of distinct slaving devices. In this case, said system of electric flight controls comprises means of switching making it possible, when said means of detection detect the appearance of said induced vibrations, to:
- disable the device for slaving to a reduced frequency band; and
- enable said device for temporary slaving to a widened frequency band in such a way that the servocontrol associated with said control surface can be governed by said overall control command.

As a variant, said means of slaving to a reduced frequency band and means of temporary slaving to a widened frequency band consist, at least in part, of the same hardware items, at least some of which (in particular the gain amplifiers) are adjustable so as to allow the frequency operating limit to be shifted from at most 4 Hz to at least 15 Hz.

Preferably, said means of computation are disabled while no windmilling of a fan is detected and they are enabled by said means of detection upon the appearance of said induced vibrations.

In the general case where the aircraft comprises at least two pairs of symmetric control surfaces and where said system of electric flight controls produces for said control surfaces a electric vertical flight control command and a electric lateral flight control command:

said means of measurement deliver the vertical component and the lateral component of said induced vibrations;

said means of computation compute a first and a second additional electric control command able respectively to counter said vertical and lateral components of said induced vibrations;

said means of summation add together:

said vertical electric flight control command and said first additional electric control command to form a first overall control command;

said lateral electric flight control command and said second additional control command to form a second overall control command; and said means of temporary slaving to widened frequency band slave, to said first overall control command, the servocontrols of the two symmetric control surfaces of one of said pairs, in such a way that these latter control surfaces deflect symmetrically in the same direction; and said means of temporary slaving to widened frequency band slave, to said second overall control command, the servocontrols of the two symmetric control surfaces of the other of said pairs in such a way that these latter control surfaces deflect antisymmetrically in opposite directions.

Preferably, said means of computation and said table form an integral part of said system of electric flight controls.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
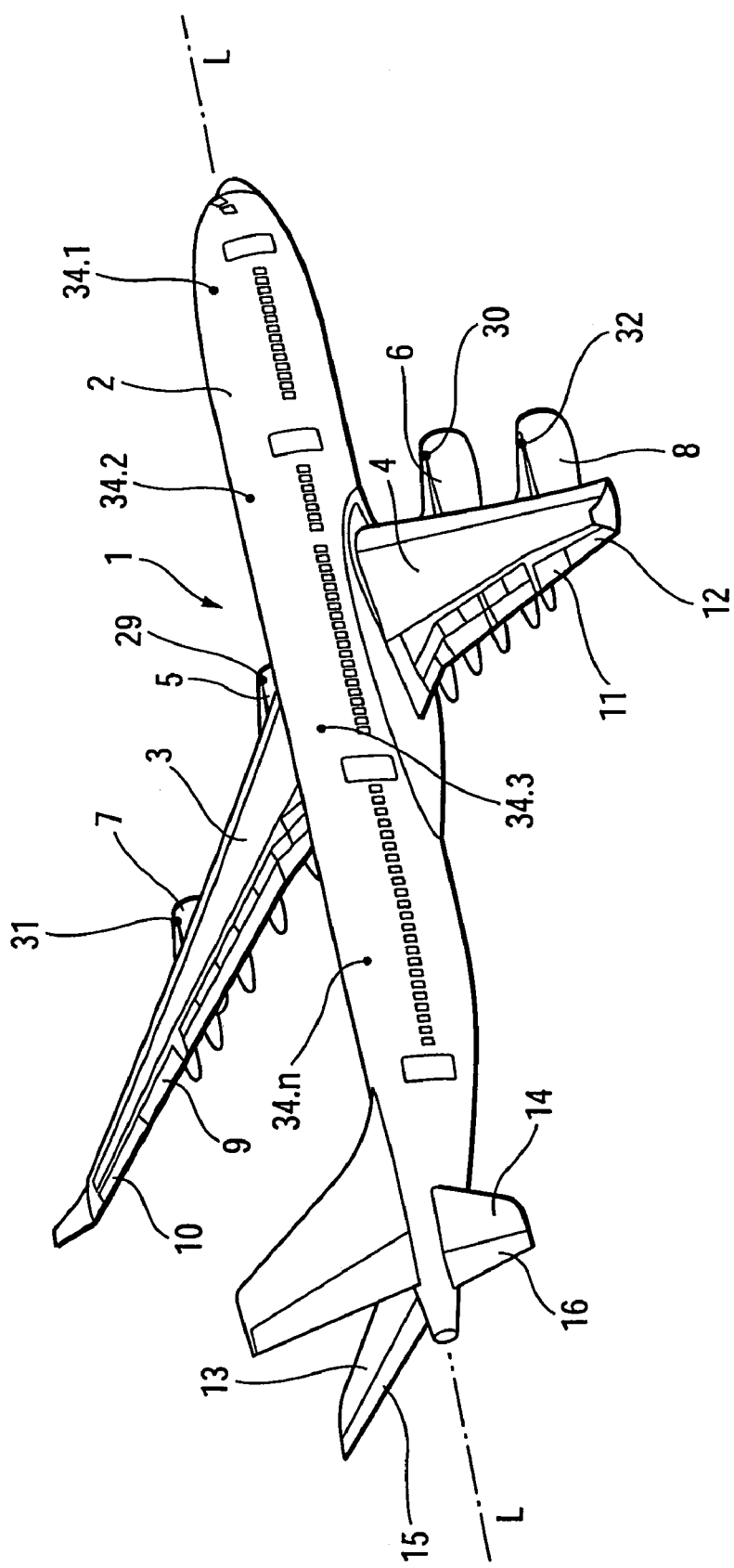
FIG. 1 shows, in perspective from above, a wide-bodied airplane.

The four-engined wide-bodied airplane 1, represented diagrammatically in perspective in FIG. 1, comprises a fuselage 2 of longitudinal axis L—L and two wings 3 and 4 disposed on either side of said fuselage 2. Each wing carries an inboard engine 5 or 6 and an outboard engine 7 or 8, said engines 5 to 8 being of the turbofan type. Moreover, among other control surfaces, the wing 3 carries an inboard aileron 9 and an outboard aileron 10. Likewise, the wing 4 carries, among other control surfaces, an inboard aileron 11 and an outboard aileron 12. The two wings 3 and 4 are mutually symmetric with respect to the fuselage 2 as are their engines and their ailerons, taken pairwise. At the rear, the airplane 1 moreover comprises symmetric horizontal empennages 13 and 14, respectively provided with mutually symmetric elevators, bearing the references 15 and 16 respectively.

Figure 2:
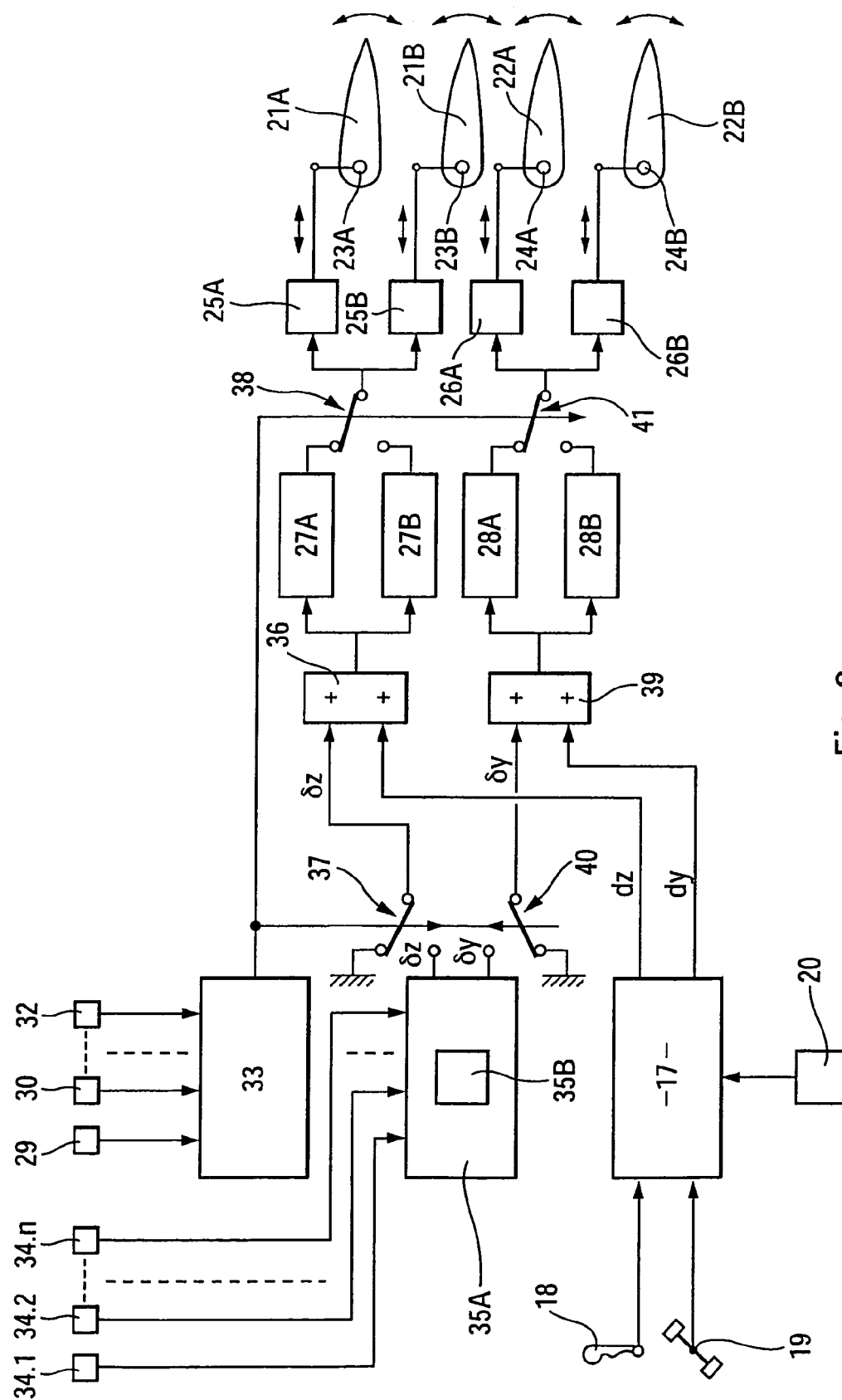
FIG. 2 shows the schematic diagram of a system of electric flight controls for the airplane of FIG. 1, said system being enhanced in accordance with the present invention so as to avoid the vibratory effects of the windmilling of the fan of at least one engine of said airplane.

To control one or the other of the control surfaces 9 to 12, 15 and 16, the airplane 1 comprises a system of electric flight controls 17, receiving steering-commands for steering members 18 and 19 (stick, rudder bar, etc) actuated by a pilot or through an automatic pilot 20, as is represented in FIG. 2. In response to said steering commands, said system of electric flight controls 17 computes a vertical electric flight control command dZ and a lateral electric flight control command (that is to say horizontal and orthogonal to the axis L—L) dY.

Represented in FIG. 2 are two pairs of symmetric control surfaces 21A, 21B on the one hand, and 22A, 22B on the other hand.

The pair of control surfaces 21A, 21B is representative of one or the other of the pairs of symmetric control surfaces 9–11, 10–12 and 15–16 described hereinabove. Preferably, the pair of control surfaces 22A–22B is representative of one or the other of the pairs of symmetric control surfaces 9–11 and 10–12.

Each control surface 21A, 21B, 22A, 22B is provided with a respective rotation shaft 23A, 23B, 24A, 24B, about which it can revolve under the action of a respective servocontrol 25A, 25B, 26A, 26B.

The servocontrols 25A and 25B are controlled in common by a slaving device 27A receiving said vertical command dZ from the system 17 and they deflect the two control surfaces 21A and 21B symmetrically, in the same direction.

The servocontrols 26A and 26B are controlled in common by a slaving device 28A receiving said lateral command dY from the system 17 and may deflect the two control surfaces 22A and 22B antisymmetrically, in opposite directions.

In standard fashion, in order to limit the fatigue of the servocontrols 25A, 25B, 26A, 26B and to reduce their sensitivity to noise, the slaving devices 27A and 28A—which may be of the open loop type or on the contrary of the closed loop type with positional feedback of the corresponding control surfaces—deliberately limit, by virtue of filters and of reduced slaving gains, the operation of said servocontrols to frequencies at most equal to 4 Hz. The frequency band from 0 to 4 Hz in which said servocontrols are permitted to operate is defined by the frequency filtering of the commands dZ and dY in said slaving devices 27A and 28A, as well as by the choice of a low slaving gain for them.

Moreover, on the nacelles of the engines 5 to 8 or at other places neighboring them, are mounted accelerometers 29 to 32 measuring the vertical and lateral components of the oscillatory accelerations to which they are subjected. The accelerometers 29 to 32 transmit their accelerometric measurements to a detector 33, able to detect windmilling of the fan of at least one of the engines 5 to 8. To do this, the detector 33 searches—through the accelerometric measurements that are addressed to it for the accelerations whose frequency lies between 5 Hz and 15 Hz (frequencies characteristic of windmilling) and whose amplitude is above a threshold, which is determined by computation (as indicated hereinabove with regard to the modified aeroelastic model) and/or by trials and which is representative of the appearance of the windmilling of at least one of the fans.

Likewise, at diverse locations of the wide-bodied airplane 1, in particular in the passenger cabin and on the flight deck, are mounted accelerometers 34.1 to 34.n, etc measuring, at these locations, the vertical and lateral components of the oscillatory accelerations. These latter measurements are addressed to a computer 35A, able to compute additional electric control commands δZ and δY which, applied respectively to the servocontrols 25A, 25B of the control surfaces 21A, 21B and to the servocontrols 26A, 26B of the control surfaces 22A, 22B, allow these control surfaces to counteract the vibrations at the locations of the accelerometers 34.1 to 34.n.

A table 35B is incorporated into the computer 35A and it contains relations which are preestablished on the basis of said modified aeroelastic model, such as defined hereinabove, and which, for each vertical and lateral component of the accelerometric measurements at the locations of the accelerometers 34.1 to 34.n, deliver additional electric control commands δZ and δY able to counter respectively said components at these locations and appearing at the two outputs of the computer 35A.

In parallel with the slaving devices 27A and 28A are, moreover, respectively mounted additional slaving devices 27B and 28B—of the open loop type or of the closed loop type—allowing the servocontrols 25A, 25B, 26A and 26B to operate at frequencies at least equal to 15 Hz.

In a similar manner to what was mentioned in respect of the slaving devices 27A and 28A, the widened frequency band of 0 to 15 Hz in which the slaving devices 27B and 28B permit the operation of the servocontrols 25A, 25B, 26A, 26B is defined by frequency filters incorporated into said devices 27B and 28B, as well as by the choice of a higher slaving gain for them.

The inputs of the slaving devices 27A and 27B are connected to the output of a summator 36, an input of which is connected to the output dZ of the system of electric flight controls 17 and the other input of which can be connected to the output δZ of the computer 35A, by way of a switch 37, controlled by the detector 33. Moreover, one or the other of the outputs of the slaving devices 27A and 27B is connected to the servocontrols 25A and 25B by a switch 38, likewise controlled by the detector 33.

In a similar manner, the inputs of the slaving devices 28A and 28B are connected to the output of a summator 39, an input of which is connected to the output dY of the system of electric flight controls 17 and the other input of which can be connected to the output δY of the computer 35A, by way of a switch 40, controlled by the detector 33. Moreover, one or the other of the outputs of the slaving devices 28A and 28B is connected to the servocontrols 26A and 26B by a switch 41, likewise controlled by the detector 33.

When the detector 33 detects no acceleration whose frequency lies between 5 Hz and 15 Hz and whose amplitude is above said predetermined threshold, the switches 37 and 40 disable the computer 35A and the switches 38 and 41 connect the output of the slaving device 27A to the servocontrols 25A and 25B and the output of the slaving device 28A to the servocontrols 26A and 26B.

Thus, when, in flight, none of the engines 5 to 8 is shut down, the servocontrols 25A, 25B, 26A and 26B (and hence the control surfaces 21A, 21B, 22A, 22B) are respectively controlled by the system of electric flight controls 17 alone, by way of the summators 36 and 39 and of the devices for slaving 27A and 28A to operating frequency band limited above to 4 Hz.

On the other hand, as soon as the detector 33 detects induced vibrations, due to the windmilling of the fan of at least one shut-down engine 5 to 8, it toggles the switches 37, 38, 40 and 41. Thereby, the computer 35A and the devices for slaving 27B and 28B to widened frequency band are enabled, whereas the slaving devices 27A and 28A are disabled. In this case, the servocontrols 25A, 25B and 26A, 26B are respectively controlled by overall commands represented by the sums dZ+δZ and dY+δY of the control commands dZ, dY produced by the system 17 and the additional control commands δZ and δY computed by the computer 35A, said sums being calculated respectively by the summators 36 and 39 and being applied by way of the devices for slaving 27B and 28B to widened frequency band.

The control surfaces 21A and 21B may therefore oscillate symmetrically, under the dependence of the additional control command δZ, so as to counter the vertical components of the vibrations induced by the windmilling of the fan of at least one of the engines 5 to 8, while responding to the control command dZ produced by the system of flight controls 17.

Likewise, the control surfaces 22A and 22B can oscillate antisymmetrically, under the dependence of the additional control command δY, so as to counter the lateral components of the vibrations induced by such windmilling, while responding to the control command dY emanating from the system 17.

Figure 3:
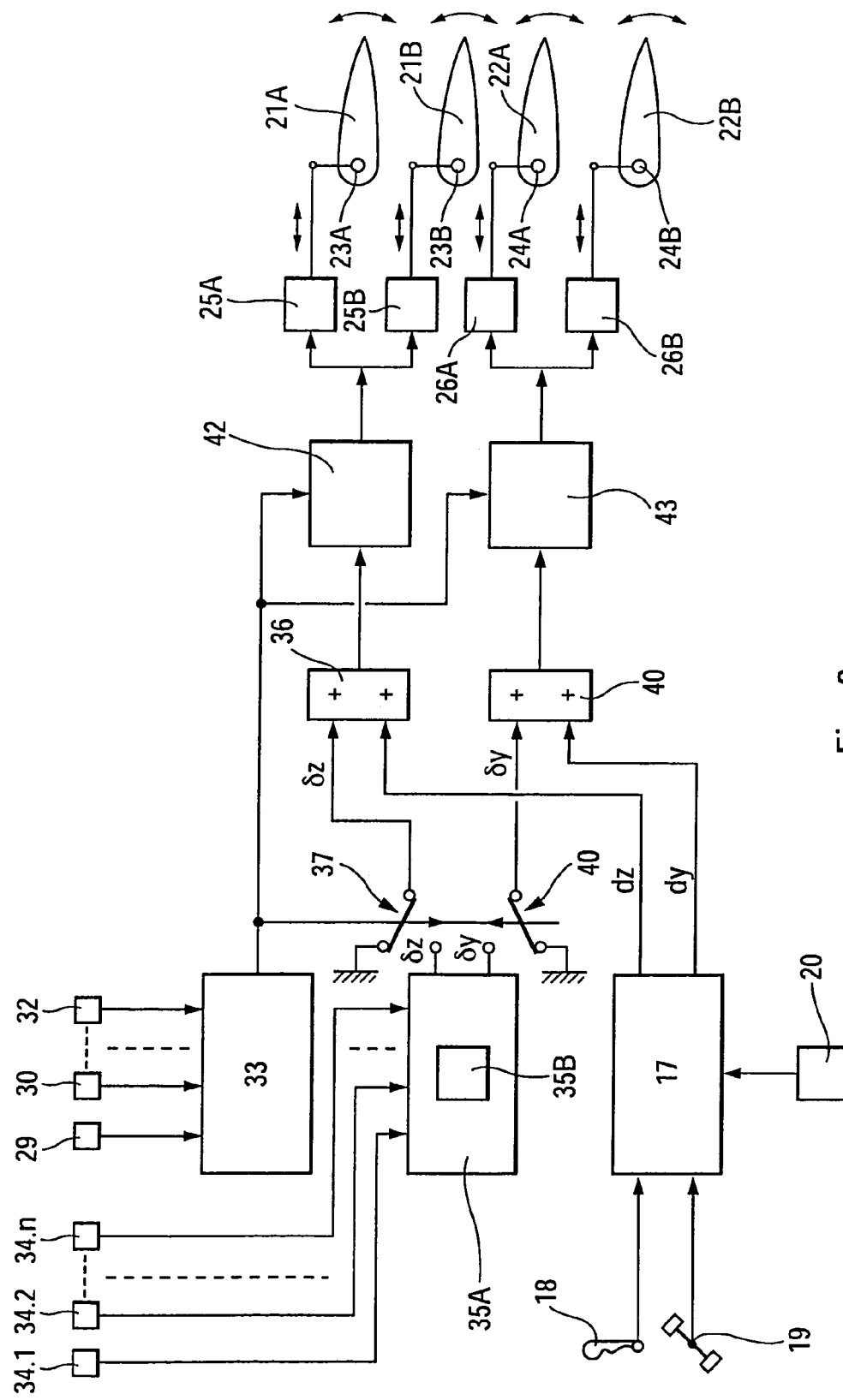
FIG. 3 illustrates a variant embodiment of the system of FIG. 2.

In the variant embodiment of FIG. 3, all the elements shown in FIG. 2 are found again, with the exception of the switches 38 and 41, which have been removed. Moreover, the slaving devices 27A and 27B have been removed and replaced with a single slaving device 42. Likewise, the slaving devices 28A and 28B have been removed and replaced with a single slaving device 43.

These slaving devices 42 and 43, which may be of the open loop type or of the closed loop type, comprise adjustable elements, for example slaving gain amplifiers, controlled by the detector 33. Thus, in the absence of windmilling of at least one of the fans, the slaving devices 42 and 43 limit the operation of the servocontrols 25A, 25B, 26A, 26B to the reduced frequency band of 0 to 4 Hz. On the other hand, in case of appearance of windmilling, the adjustable elements of the slaving devices 42 and 43 are controlled by the detector 33 to allow the operation of said servocontrols 25A, 25B, 26A, 26B at the widened frequency band of 0 to 15 Hz.

What is claimed is:

1. A process for countering the vibrations induced in an aircraft by the windmilling of an engine fan, the process comprising:
   producing a first electric flight control command for a servocontrol to use in actuating a control surface of the aircraft;
   slaving the servocontrol to the first electric flight control command;
   limiting the operation of the servocontrol to a reduced frequency band;
   monitoring vibrations induced by the windmilling of the fan; and
   executing, when the monitored vibrations exceed a threshold, the operations of:
   computing a second electric flight control command, for application to the servocontrol, that operates to oppose the induced vibrations;
   summing the first and second electric flight control commands to produce an overall control command for the control surface;
   temporarily slaving the servocontrol to the overall control command; and operating the servocontrol in a widened frequency band.

2. The process of claim 1, wherein monitoring the induced vibrations comprises:
performing accelerometric measurements of the induced vibrations at a point of the aircraft; and
comparing the amplitude of the accelerometric measurements, whose frequencies are between 5 Hz and 15 Hz, to the threshold.

3. The process of claim 2, wherein the accelerometric measurements are performed at the engines.

4. The process of claim 1, wherein, to compute the second electric flight control command, accelerometric measurements of the induced vibrations are made at a location of the aircraft and the second electric flight control command is determined on the basis of preestablished relations between prospective accelerometric measurements and prospective flight control commands.

5. The process of claim 4, wherein the flight deck is the location where the accelerometric measurements are made for computing the second electric flight control command.

6. The process of claim 4 applied to an aircraft comprising two pairs of symmetric control surfaces, wherein the aircraft is steered by a vertical electric flight control command and a lateral electric flight control command, the process further comprising:
computing a third electric flight control command to counter the vertical component of the induced vibrations measured at the location;
computing a fourth electric flight control command to counter the lateral component of the induced vibrations measured at the location;
summing the vertical electric flight control command and the third electric flight control command to obtain an overall vertical control command;
summing the lateral electric flight control command and the fourth electric flight control command to obtain an overall lateral control command;
slaving servocontrols of a first of the two pairs of symmetric control surfaces to the overall vertical control command such that the first pair of control surfaces deflect symmetrically in the same direction; and
slaving servocontrols of a second of the two pairs of symmetric control surfaces to the overall lateral control command such that the second pair of control surfaces deflect anti-symmetrically in opposite directions.

7. A system of electric flight controls for an aircraft, the system comprising:
a means for detecting vibrations induced in the aircraft by the windmilling of an engine fan;
a means of measuring the induced vibrations at a location of the aircraft;
a table that stores preestablished relations between prospective vibration measurements and prospective control surface operations to counter the induced vibrations;
a means for computing a vibration-countering electric flight control command, in accordance with a vibration measurement and its related control surface operation, that will counter the induced vibrations when applied to a control surface;
a means for summing an electric flight control command and the vibration-countering electric flight control command into an overall control command for the control surface; and
a first means for temporarily slaving a servocontrol of the control surface to the overall control command and operating the servocontrol in a widened frequency band.

8. The system of claim 7, wherein the detecting means comprises accelerometers located at the engine of the aircraft.

9. The system of claim 7, wherein the measuring means comprises accelerometers located in the flight deck of the aircraft.

10. The system of claim 7, further comprising:
a second means for slaving the control surface servocontrol to operate according to a reduced frequency band; and
a means for switching control of the servocontrol between the first and second slaving means, wherein:
the servocontrol is controlled by the second slaving means when the measured induced vibrations do not exceed a threshold, and
the servocontrol is controlled by the first slaving means when the measured induced vibrations exceed the threshold.

11. The system of claim 7, wherein the first and second slaving means consist essentially of the same hardware items, some of which are adjustable so as to allow the frequency band to be varied.

12. The system of claim 7, wherein the computing means is enabled by the detecting means when the measured induced vibrations exceed a particular amount.

13. The system of claim 7, further comprising:
two pairs of symmetric control surfaces, the system of electric flight controls producing for the two pairs of control surfaces a vertical electric flight control command and a lateral electric flight control command, wherein:
the measuring means measures the vertical and lateral components of the induced vibrations;
the computing means computes a first and a second electric flight control command to counter, respectively, the measured vertical and lateral components of the induced vibrations;
the summing means adds:
the vertical electric flight control command and the first electric flight control command to form a first overall control command;
the lateral electric flight control command and the second electric flight control command to form a second overall control command; and
the first temporary slaving means slaves to the first overall control command servocontrols for a first of the two pairs of symmetric control surfaces such that the first pair of control surfaces deflect symmetrically in the same direction; and
the first temporary slaving means slaves to the second overall control command servocontrols for a second of the two pairs of symmetric control surfaces such that the second pair of control surfaces deflect anti-symmetrically in opposite directions.

14. The system of claim 7, wherein the computing means is an integral part of the system of electric flight controls.

* * * * *